March 10, 1964  D. D. RHOADS  3,124,402
PAN AND TRAY SUPPORTS
Filed March 25, 1960
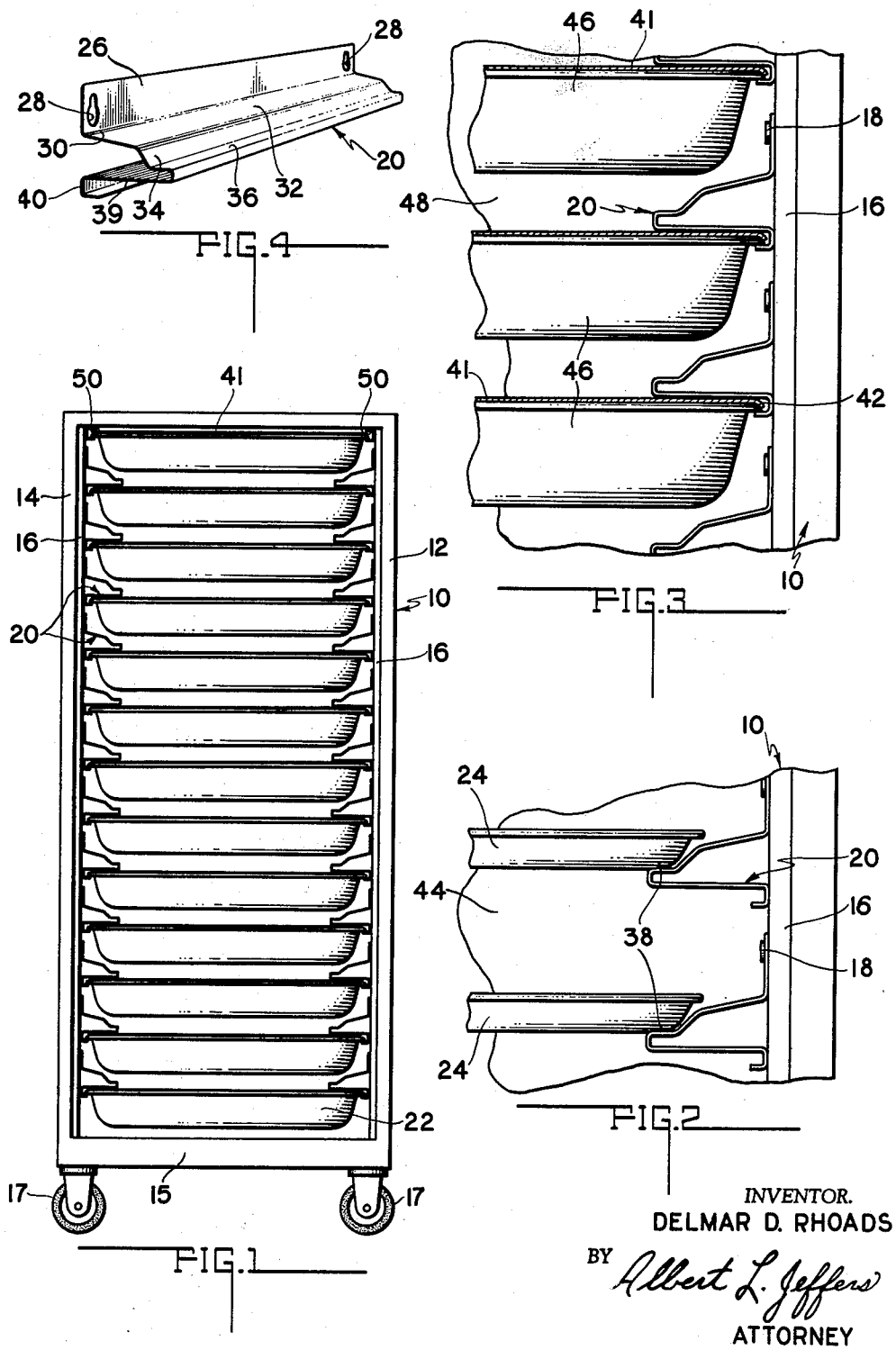
INVENTOR.
DELMAR D. RHOADS
BY Albert L. Jeffers
ATTORNEY 3,124,402
PAN AND TRAY SUPPORTS
Delmar D. Rhoads, 5311 Indiana Ave., Fort Wayne, Ind.
Filed Mar. 25, 1960, Ser. No. 17,616
3 Claims. (Cl. 312—350)

This invention relates to a storage cabinet wherein are mounted a plurality of food receptacles such as pans, trays and the like.

The invention is more particularly related to novel means for mounting the food receptacles within the storage cabinet in an efficient manner providing easy access to the receptacles and their ready removability and insertion according to use.

It is one of the objects of the present invention to provide a novel combination pan and tray clip which forms both a hanger and a support ledge for the food receptacles, which are stored in such manner that the space within the cabinet can be efficiently filled but without hampering loading and unloading of the cabinet.

A further object of the invention is to provide a novel supporting structure for the pans and trays within the cabinet which can be easily removed to permit cleaning of the cabinet and also permit rearrangement of the supporting structure for different size food receptacles.

A still further object of the invention is the provision of novel means for locking or sealing the pan cover to the top of the pan to prevent spillage of the contents when the storage cabinet is in transit.

While the invention will be illustrated with reference to certain specified pan and tray food receptacles, it will be understood that this invention is not in any way limited by a particular shape or configuration of the food receptacle since these may obviously differ.

Other objects and features of the invention will become apparent from a consideration of the following description which proceeds with reference to the accompanying drawings wherein:

FIGURE 1 is a side elevation view of the storage cabinet, the door of the cabinet being removed to illustrate the method of stacking the food receptacles;

FIGURE 2 is an enlarged fragmentary view illustrating the details of stacking food trays;

FIGURE 3 is an enlarged fragmentary detail view illustrating the manner of supporting the pans within the cabinet; and, FIGURE 4 is an isometric view of one supporting member shown detached from the storage cabinet.

The storage cabinet designated generally by reference numeral 10 has oppositely facing vertical support walls 12 and 14 which are insulated to retain the interior of the cabinet at some preferred temperature. The cabinet may be mounted at its base 15 on cannister rollers 17 to facilitate transporting the cabinet. During loading and unloading the cabinet, a heat insulated door (not shown) is opened and thereafter closed to maintain the interior temperature of the cabinet. The vertical edges of supporting walls 12 and 14 have stanchions 16 to which are fastened rivets 18 having a neck of smaller diameter than the exposed rivet head.

A plurality of combination pan and tray clips 20 are the supporting members for the stack of alternating pans 22 and trays 24 which are stacked in alternating relation within the cabinet, each set of oppositely facing pan and tray clips providing support for both a pan and a tray. The support members 20 are spaced on the respective side walls 12 and 14 to form complementary pairs of support members at the same vertical level, and the spacing defined between adjacent pairs of support members is proportioned to accommodate both a tray and a pan therebetween.

Referring to FIGURE 4, each supporting member comprises a flange 26 having a keyhole opening 28 at each of its opposite ends which fits over the head of the mounting rivet 18 and then locks in the neck of the rivet at the smaller diameter portion of the opening 28 to secure the support member 20 in place. The support member is formed typically of a sheet steel stamping and may be chromium plated to resist corrosion. The supporting member is bent at 30 to form a portion 32 projecting away from the supporting wall and is stepped at 34 to provide a ledge 36, the complementary ledges 36 of a respective pair of support members, extending inwardly to provide support for the opposite edges 38 of a tray which is inserted lengthwise within the storage cabinet and takes support on the ledges 36.

The sheet metal forming the supporting member is bent backwardly from the ledge 36 to form a base 39 which extends between the ledge 36 and its supporting wall and is then formed into a U-shaped cross section channel 40 opening away from the supporting wall. The base 39 serves as a sealing means for locking the cover to the pan 46. Channels 40 are proportioned to receive slidably therein the opposite edges 42 of a pan, complementary supporting members of a given set providing necessary vertical support for the pan which is inserted lengthwise until it fits entirely within the cabinet. The channels of a respective pair of support members serve as vertical hangers for the pan.

Referring to FIGURE 2, the support members are spaced at vertical intervals so that when the trays 24 are in place there is sufficient remaining volume 44 to accommodate the deep dish pan 46 and likewise the space 48 (FIGURE 3) is sufficient to accommodate the shallower tray 24 with the pans 46 in place. It will be seen, therefore, that each pair of supporting members carries both a pan and a tray but each pan and tray can be separately removed without disturbing the other, and the arrangement of pans and trays substantially fills the volumetric capacity of the cabinet 10 so that maximum usage of the cabinet 10 can be obtained.

The supporting members can be easily removed by forcing them upwardly whereby they are disengaged from the rivets 18 and thereafter removed from the cabinet for cleaning the cabinet. The support members can also be arranged in whatever succession of vertical levels is required to accommodate the specific dimensions of the pans and trays.

One specific example of a storage cabinet is one 23 inches wide and 26 inches deep which will accommodate a 14-inch by 18-inch tray or 18-inch by 26-inch tray. The pan size used in the specific example is one 13 inches by 21 inches.

As shown in FIGURE 1, the uppermost pan is carried by a channel 50 at each of the opposite supporting walls 12 and 14, which can be permanently secured or removably secured to the supporting walls as preferred.

While the invention has been illustrated in connection with a single selected embodiment of the invention, it will be understood that this is for illustrative purposes only. It is reasonably to be expected that those skilled in the art can make various adaptations and revisions of the invention to suit particular requirements, and it is intended that such revisions and variations as incorporate the herein disclosed principles will be included within the scope of the following claims as equivalents of the invention.

What is claimed is:

1. In a storage cabinet having oppositely facing vertical side walls, a plurality of support members for a vertical stack of pans and trays, means for securing said support members at spaced vertical levels to the oppositely facing vertical walls to form complementary pairs of support members with the respective members of each pair at the same vertical level, each said support member having a portion extending away from its supporting wall and forming a downwardly stepped substantially flat support margin complementary with its paired support member to provide sliding support at the opposite edges of a tray thereon, an integral portion of each support member extending from said margin toward its supporting wall and at a lower vertical level, and a U-shaped cross section portion of each support member opening away from its supporting wall and proportioned to receive slidably therein one pan edge and cover with the other pan edge and cover carried by its complementary supporting member, said U-shaped cross section being proportionately spaced to lock the pan cover to the top of the pan, said pairs of support members having vertical spacing therebetween proportioned to admit both a pan and tray between successive adjacent pairs of support members.

2. A combination deep dish pan and tray support member comprising a mounting flange having means for removably suspending the support member at its opposite ends, a doubled-over section of said support member proportioned with a spacing therebetween and including on one part of said doubled-over section an inclined and stepped configuration defining a first carrying ledge at the outer extremity thereof for a tray, and a U-shaped cross section portion of said support member at the side opposite said mounting flange and opening in the direction of said first carrying ledge defining a second carrying ledge for a deep dish pan having a rectangular shape larger than the tray.

3. A support member comprising a mounting flange having means for removably suspending the support member at its opposite ends, a doubled-over section of said support member proportioned with a spacing therebetween and including on one part of said doubled-over section an inclined and stepped configuration defining a carrying ledge at the outer extremity thereof, and a U-shaped cross section portion of said support member at the side opposite said mounting flange and opening in the direction of said carrying ledge, said portion provided with a channel forming a set to receive the opposite edges of a pan, and said portion being proportionally spaced to lock a pan cover to the top of the pan.

References Cited in the file of this patent
UNITED STATES PATENTS

| | | |
|---|---|---|
| 617,164 | Jewett | Jan. 3, 1899 |
| 652,408 | Sullivan | June 26, 1900 |
| 2,297,859 | Anderson | Oct. 6, 1942 |
| 2,341,093 | Haberstump | Feb. 8, 1944 |
| 2,499,179 | Boddy | Feb. 28, 1950 |
| 2,574,950 | Ben-dor | Nov. 13, 1951 |
| 2,763,526 | Falek | Sept. 18, 1956 |
| 2,815,649 | Di Angelus et al | Dec. 10, 1957 |